F. C. BILLINGS.
EXTENSION BRACKET FOR PIANO ACTIONS.
APPLICATION FILED NOV. 22, 1909.
1,056,395.
Patented Mar. 18, 1913.
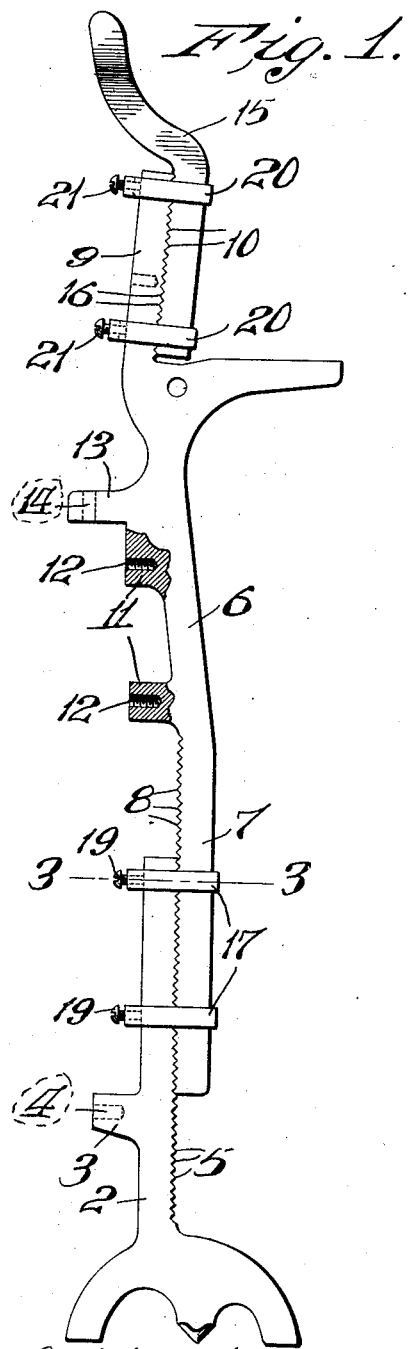
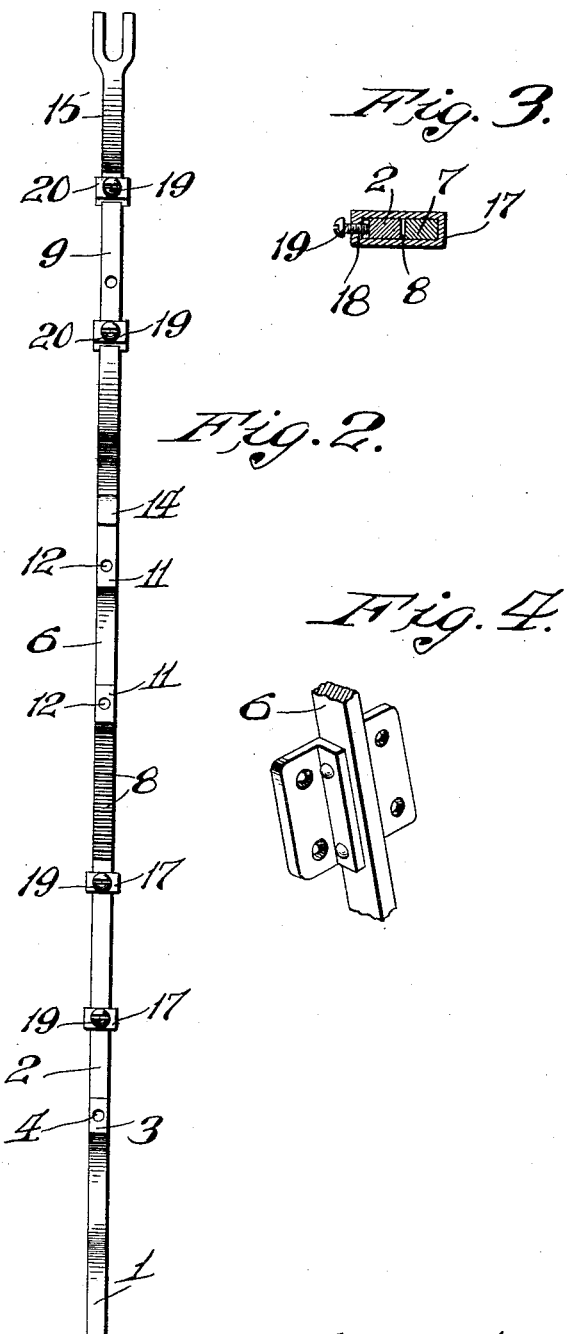
Inventor:
Frederick C. Billings.

UNITED STATES PATENT OFFICE.

FREDERICK C. BILLINGS, OF MILWAUKEE, WISCONSIN.

EXTENSION-BRACKET FOR PIANO-ACTIONS.

1,056,395.  Specification of Letters Patent.  Patented Mar. 18, 1913.

Application filed November 22, 1909. Serial No. 529,237.

*To all whom it may concern:*

Be it known that I, FREDERICK C. BILLINGS, a citizen of the United States, and resident of Milwaukee, Wisconsin, have invented certain new and useful Improvements in Extension-Brackets for Piano-Actions, of which the following is a specification containing a full, clear, and exact description, reference being had to the accompanying drawings, forming a part hereof.

My invention relates to improvements in extension brackets for supporting the action rails of upright pianos, the object of my invention being to construct a bracket constructed of a number of parts vertically adjustable relative to each other as required to adapt them for supporting the rails of piano actions of various makes and sizes.

The construction of each of the parts of the brackets is such that they may be readily stamped from sheet metal.

A further object of my invention is to construct improved means for securing the various parts of such brackets together.

For the above purposes my invention consists in certain novel features of construction and arrangement of parts as will be hereinafter more fully described, pointed out in the claim and illustrated by the accompanying drawing, in which:

Figure 1 is an elevation of a complete bracket, certain portions being shown in section; Fig. 2 is an elevation of the complete bracket taken at right angles to Fig. 1; Fig. 3 is a sectional plan taken on the line 3—3 of Fig. 1; and Fig. 4 is a perspective showing a modified form of means for connecting wooden rails to the bracket.

Referring by numerals to the accompanying drawing: 1 designates the base of the bracket, 2 a vertically disposed integral member of the base and 3 a laterally disposed projection having an internally threaded recess 4. The entire face of the member 2, opposite the projection 3, is provided with teeth 5.

6 designates the central member of the bracket, having a portion 7 one face of which is provided with teeth 8 adapted to inter-engage with the teeth 5 formed on the member 2 of the base section.

9 designates an integral upwardly projecting member of the member 6, one face of which is provided with teeth 10.

11—11 designate laterally projecting integral extensions of the member 6 each of which is provided with a threaded aperture 12.

13 designates a lateral projection of the member 6 provided with an aperture 14.

15 designates the upper member of the bracket, the lower end of which is provided with teeth 16 inter-engaging with the teeth 10 formed on the portion 9 of the central member 6.

Embracing the portions 2 and 7 are the rectangular clamping rings or bands 17, each of which is provided with a threaded aperture 18, and, carried by each threaded aperture is a set screw 19. The rings or bands 17 are of sufficient length to permit the portions 2 and 7 to move relative to each other through the rings or bands. Rectangular rings or bands 20, identical in construction with the rings 17 and carrying set screws 21, are arranged for embracing the portion 9 and the lower part of the upper member 15.

Each of the parts of the bracket proper is of such design and contour as to be readily stamped from sheet metal, preferably steel, and when assembled they form an extension bracket for piano actions for supporting the horizontally disposed rails of the actions. The extensible feature of the bracket permits the use of such a bracket in a number of different makes of pianos and is applicable for receiving and supporting angle-bar rails, straight metal rails, tubular rails and even the old style wooden rails. And by the use of the rectangular clamping rings co-acting with the teeth formed on the various parts of the bracket, the parts are clamped together in a rigid manner without the necessity of perforating any of the parts to receive screws for clamping the parts together.

It is obvious that the base section 1 and central section 6 may be vertically adjusted relative to each other by a manipulation of the set screws 19 thereby permitting the teeth 5 and 8 to move laterally relative to each other so they may be free to move vertically relative to each other. After the desired adjustment is accomplished the parts may be secured together by a drawing up of the clamping rings 17. An adjustment of the member 15 with the portion 9 of the central member may be accomplished in the manner just described by loosening the set screws 21 and freeing the teeth 10 and 16 so that they may be moved vertically relative to each other.

Heretofore such brackets were formed by casting with slots in the various parts to permit the desired vertical adjustment of the parts relative to each other. By reason of the devices being made of cast metals and having said adjusting slots, there was frequent breakage of the brackets in transportation. By my improved construction each of the parts or sections of the brackets is constructed from sheet metal, which construction is not only more cheaply manufactured but is less liable to breakage.

I claim:

A piano-action rail-supporting bracket, comprising a number of sections, the ends of which overlap and are provided with ratchet-teeth which interlock, bands arranged to completely embrace the overlapped ends of said sections, and set screws carried by said bands, substantially as shown and for the purposes stated.

In testimony whereof, I have signed my name to this specification, in presence of two subscribing witnesses.

FREDERICK C. BILLINGS.

Witnesses:
MARY E. HUGHES,
GEO. C. BANHORN.

Copies of this patent may be obtained for five cents each, by addressing the "Commissioner of Patents, Washington, D. C."